April 21, 1953
E. LOSSAU
2,635,544
HYDRAULIC VALVE LIFTING MECHANISM
Filed March 6, 1948
4 Sheets—Sheet 1
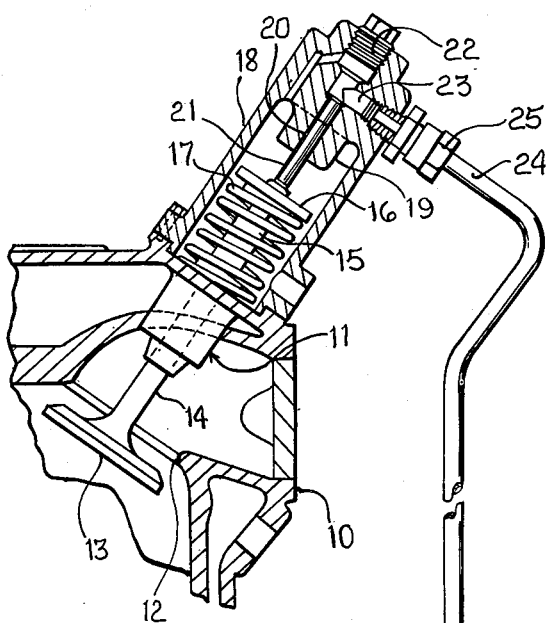
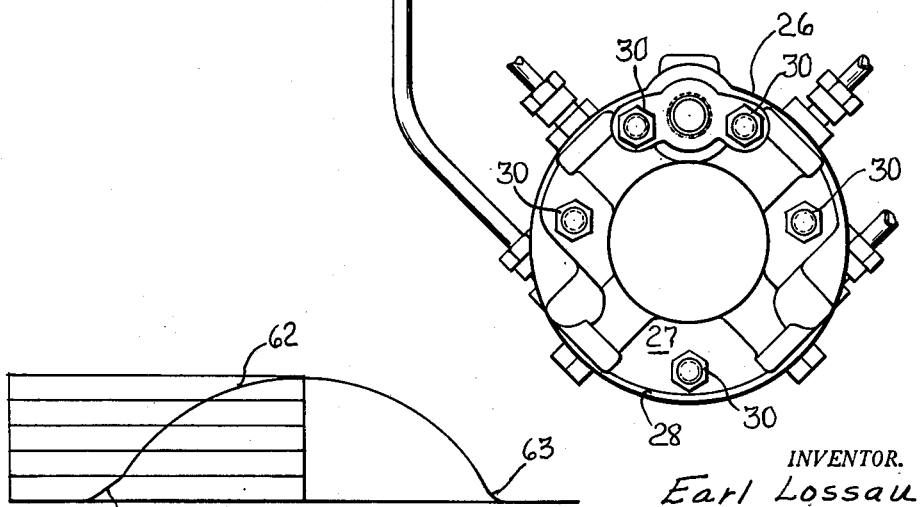
INVENTOR.
Earl Lossau
BY Clarence E. Sheedy
His Attorney.

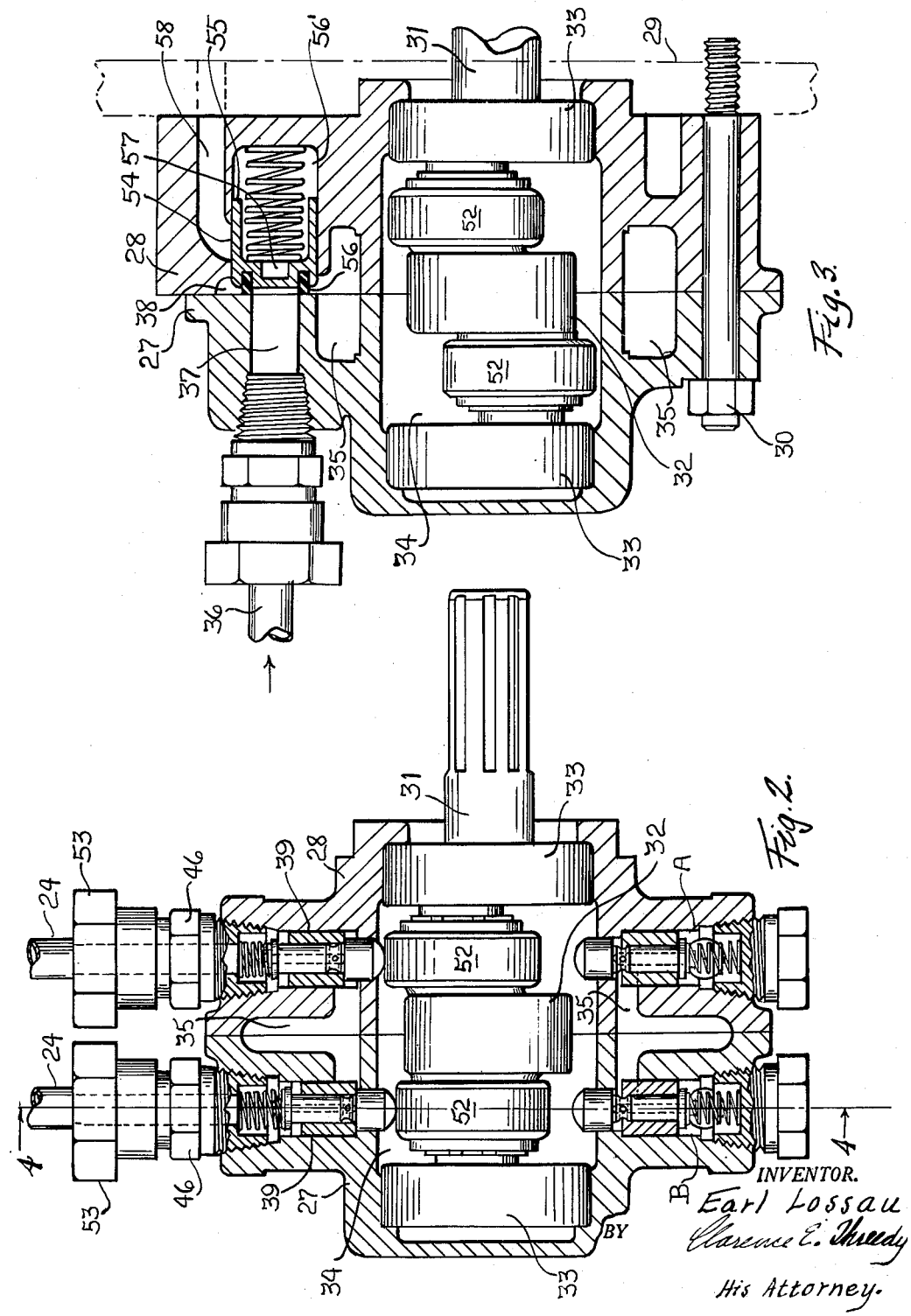

April 21, 1953 — E. LOSSAU — 2,635,544
HYDRAULIC VALVE LIFTING MECHANISM
Filed March 6, 1948 — 4 Sheets-Sheet 3

INVENTOR.
Earl Lossau
BY Clarence E. Threedy
His Attorney

Patented Apr. 21, 1953

2,635,544

UNITED STATES PATENT OFFICE 2,635,544

HYDRAULIC VALVE LIFTING MECHANISM

Earl Lossau, Chicago, Ill.

Application March 6, 1948, Serial No. 13,434

1 Claim. (Cl. 103—4)

This invention relates to hydraulic valve lifting mechanism. More particularly the invention has reference to a mechanism for operating the valves of an internal combustion engine or the like. The present invention constitutes an improvement over that shown in my prior patent, No. 2,306,131, dated December 22, 1942, and granted to me on a Hydraulic Valve Lifting Mechanism.

It is essential for the efficient operation of a valve lifting mechanism of the character described that a sufficient fluid pressure in the hydraulic lines be maintained, otherwise there results sluggishness in the lifting operation of the valves with the consequence that the internal combustion engine controlled by these valves has an inefficient operation. It is therefore one of the several objects of this invention to provide a mechanism which will alleviate the foregoing inefficiencies.

Experience has also proved that where a lubricant, such as oil, is employed in the hydraulic lines for lifting the valves of an internal combustion engine, the quantity of the lubricant is depreciated by reason of the fact that the operating parts utilize a portion of this lubricant for lubricating purposes, and unless an efficient means is provided for replenishing the lubricant used for this purpose, the efficient operation of the internal combustion engine will be measurably decreased.

It is therefore an object of this invention to provide a simple means for overcoming this difficulty. It also develops that due to a number of causes such as leakage, seepage or the like, the required amount of fluid is to some degree decreased, and, unless replenished, the efficient operation of the internal combustion engine is proportionately decreased.

It is therefore one of the objects of this invention to provide a mechanism which will maintain a constant fluid supply in the hydraulic system.

Ancillary to the foregoing objects is the object to provide a hydraulic valve lifting mechanism which, because of its simple construction and the minimum number of parts employed, can be manufactured at an economical cost.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a front elevational view of my improved hydraulic valve lifting mechanism showing the same in operative association with the valve mechanism of an internal combustion engine, the said mechanism being shown in a fragmentary sectional detail view;

Fig. 2 is a sectional detail view taken substantially on line 2—2 of Fig. 4;

Fig. 3 is a sectional detail view taken substantially on line 3—3 of Fig. 4;

Fig. 8 is a graph to illustrate the valve movement of the internal combustion engine;

Figure 4:
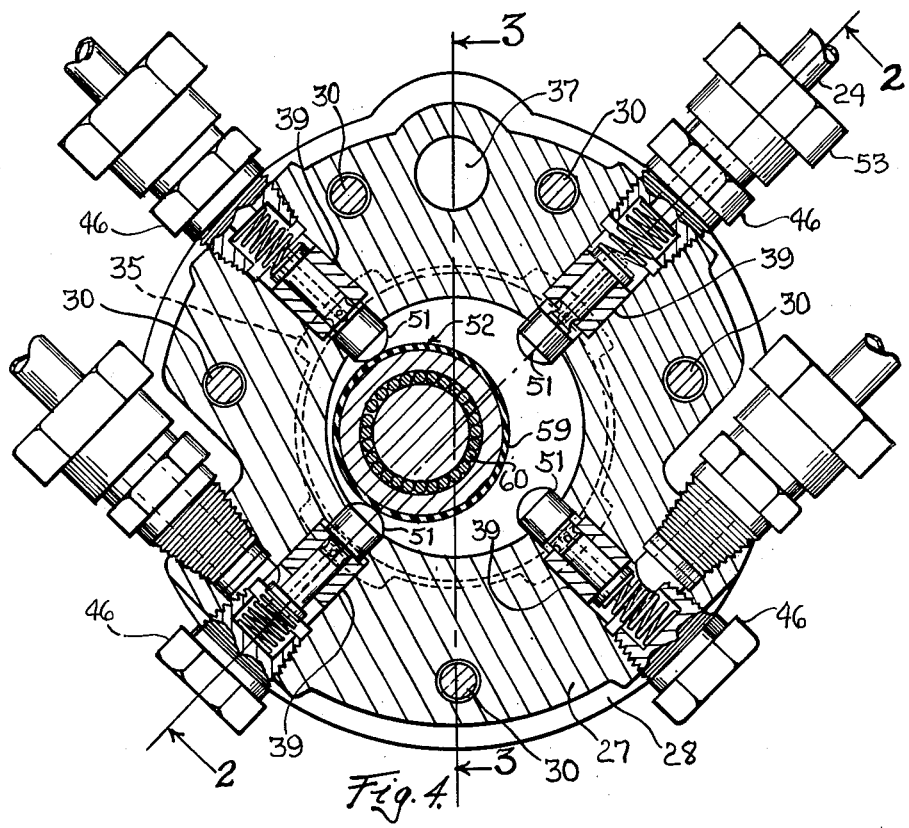
Fig. 4 is a sectional detail view taken substantially on line 4—4 of Fig. 2.

The several objects of my invention are accomplished by the preferred form of construction shown in the accompanying drawings. In this connection and referring more particularly to Fig. 1, an internal combustion engine 10 is fragmentarily illustrated, and this engine comprises a plurality of valve structures 11 controlling the intake and exhaust to each of the cylinders of the engine 10. The engine 10 in the present instance is a two-cycle engine, but it is to be understood that I am not limited to such type of engine and that my invention may be employed with any approved type of engine having intake and exhaust valve controls. The valve structure 11 includes a valve seat 12 adapted to be closed by a valve head 13. This valve head 13 is formed as an integral part of a stem 14 which reciprocates through a bearing and sleeve 15, the inner end of which comprises a cap 16. Between the cap 16 and one of the bearings 15, is arranged an expansion spring 17 for normally projecting the valve head 13 into valve-seating position with respect to the valve seat 12.

Included as a part of this valve mechanism is a cap 18 secured to the engine block in any suitable manner. This cap 18 has an internal structure 19 providing a longitudinal bore 20, in the inner end of which is mounted a reciprocatory pin 21 engaging upon the cap 16. The outer end of this bore is enlarged to receive a screw plug 22. A transversely extending passage 23 is formed in this structure 19 and communicates with the upper end of the bore 20 between the pin 21 and the plug 22. To this cap 18 and in communication with the passage 23, is a fluid line 24 connected to the cap by means of a coupling unit 25 of any approved construction.

My hydraulic valve lifting mechanism is indicated at 26 and comprises two complementary facial abutment plates 27 and 28 secured together and to a wall 29 of the internal combustion engine 10 by means of nut-bearing bolts 30.

An operating shaft is indicated at 31, and this operating shaft is connected by a train of gears (not shown) to the crank shaft (not shown) of the internal combustion engine. This shaft 31 terminates into a crank shaft 32 journalled in suitable bearings 33 arranged in the crankcase compartment 34 provided by the plates 27 and 28.

Figure 7:
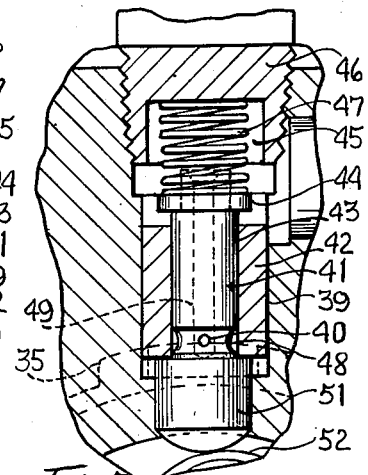

These plates 27 and 28 provide a fluid reservoir 35 having communication with a fluid supply line 36 through a port 37 and a branch passage 38, Fig. 3. This fluid reservoir 35 has communication with each of the cylinders 39 through ports 40 formed in the pistons 41. (See Figs. 5 and 7.) Each of these pistons 41 is arranged within a compressor sleeve 42 adapted for reciprocation in the cylinder 39. The piston 41 comprises a shank 43 having an integral head 44 arranged in the chamber 45 normally closed by a plug 46. Arranged between this head 44 and the plug 46 is an expansion spring 47 which projects the piston outwardly from the cylinder 39. The base of this shank 43 provides an annular groove 48 with which the ports 40 communicate. These ports 40 communicate with a central bore 49 formed in the shank 43 with their upper end portions in communication with the chamber 45. Beyond this groove 48 is provided a head 51 adapted to engage the outer surface of the eccentric cam 52. The head 44 serves to limit the projection of the piston in the direction of the cam 52. This head 51 is adapted under certain conditions more fully hereinafter explained, to engage the compressor sleeve 42 and move this sleeve within the cylinder 39. Two of the cylinders 39, such as indicated at A and B, have direct communication with the fluid conductor pipes 24, whereas the opposite cylinders 39 have communication with their respective fluid conductor pipes 24 through the plugs 46 connected to these conductor pipes by suitable couplings 53 (Fig. 2).

The course of flow of the fluid is in the direction of the arrow (Fig. 3) through the conductor pipe 36, which has communication with the fluid pump valve (not shown) of the internal combustion engine. From this supply pipe 36, the fluid passes into port 37 and, when the valve structure 54 (hereinafter more fully described) is open under pressure of the fluid passing into the port 37, the fluid passes into the fluid reservoir 35, from whence it flows through the ports 40 to the longitudinal bores 49 and then into the chamber 45. From this chamber 45, it passes into the conductor pipes 24 into the transverse bore 23 and thence into the bore 20, where it operates under pressure upon the pin 21 to compress the spring 17 and move the valve head 13 from seated position with the valve seat 12.

This valve structure 54 acts as a by-pass valve to by-pass surplus fluid pressure, should the pressure through the line 36 be measurably increased above the required pressure. It also serves as a means for bleeding air from the line and reservoir, and consequently prevents any air traps therein, particularly at the time the system is first placed under pressure.

This valve 54 comprises a valve cup 55 having an annular seal 56 preferably formed of what is known as neoprene material, a material not easily saturated with the fluid or readily deteriorated thereby. This valve cup 55 is hollow in construction and is mounted in a valve chamber 56' for longitudinal movement therein. When the valve 55 is in open position under excessive pressure of the fluid in the line 36, communication is open between port 37 and a port 58, allowing the flow of oil back into the oil crank case. It is desirable for practical purposes and for silent operation, that the cams 52 have the tread 59 on their cam head engaging surface formed of what is known as neoprene material and that these cams 52 be mounted upon the crank shaft 32 upon needle bearings 60.

Figure 5:
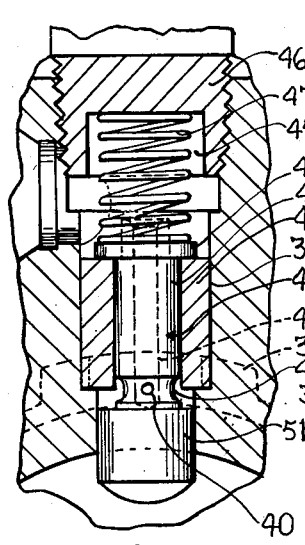
Figs. 5, 6 and 7 are fragmentary sectional detail views of the fluid compressor and transfer pistons illustrating their various operative positions.
Figure 6:
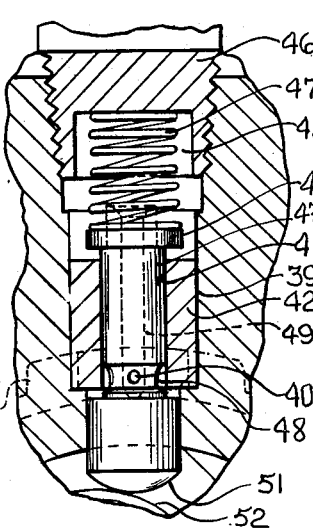

As previously explained, it is the object of this invention to compensate for the loss of fluid due to heat or temperature changes and to cushion the valve head in its closing engagement with the valve seat. To accomplish these and other objects of the invention, I have illustrated the various positions of the piston 41 and the compressor sleeve 42. For example, in Fig. 5, the piston 41 and sleeve 42 are in neutral position; that is, in a position with the cam head 51 thereof about to be engaged by the cam 52. In this position, the port 40 is in communication with the fluid reservoir 35, allowing the flow of fluid under pressure in the line through the passage 49 into the chamber 45. As the cam 52 rotates in a clockwise direction, the cam 52 is brought into engagement with the cam head 51, and after a predetermined degree of rotation, imparts movement thereto to dispose the port 40 from engagement with the fluid reservoir 35 and to dispose the cam head 51 in close proximity with the compressor sleeve 42 or in a position where the cam head is about to operate upon the sleeve 42. The next movement of the head 51, caused by the continued rotation of the cam 52, bears the cam head 51 against the sleeve 42, thereby moving the sleeve 42 in the chamber 45 against the fluid therein, compressing the fluid to impart movement of the pin 21 against the valve stem 14 to move the valve head 13 from valve seated position with respect to the valve seat 12. This initial movement of the piston 41 places the fluid in the line 24 under pressure sufficient to cause a slow but relatively even movement of the valve head 13 from valve seated position, as indicated by the graph line 61 whereby, after this movement has taken place, the piston 41 begins its uniform movement at a predetermined speed as indicated by that portion of the line 62 of the graph arm. The return movement of the piston 41 to neutral position as shown in Fig. 5, varies the pressure in the line 24 to the extent that the movement of the valve head 13 into valve seated position is cushioned by a uniform speed of movement as indicated by that part of the line 63 of Fig. 8, thus allowing the valve head to (figuratively speaking) slide into contact with the valve seat 12, as distinguished from striking thereagainst.

From the foregoing description, it is obvious that the piston 41 accomplishes the three-fold function of first replenishing the line 24 with fluid which has been otherwise dissipated by heat or temperature changes or leakage; and second, exert an initial movement to the valve head 13 toward open position; and third, cushion the valve head in its return movement to valve seated position, all prior to the movement of the compressor sleeve 42 for moving the valve head 13 from the initial moved position to the position just prior to valve seated position.

Figure 9:
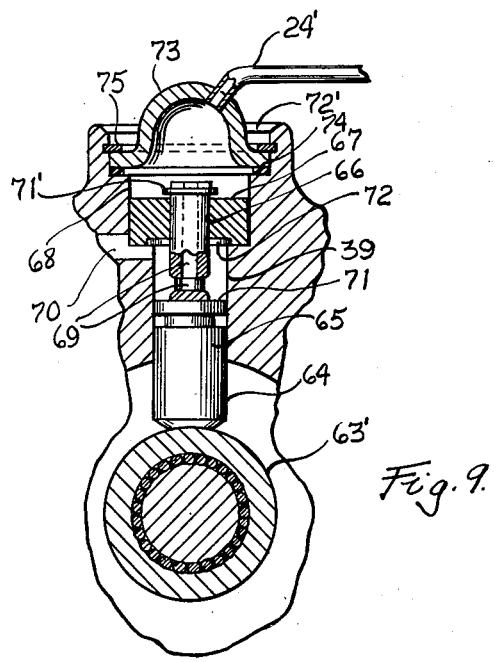
Fig. 9 is a fragmentary detail sectional view of the valve lifting mechanism illustrating a slightly modified form of construction.
Figure 10:
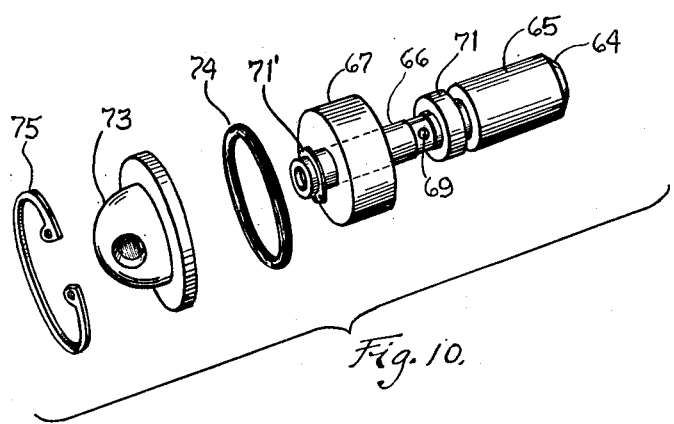
Fig. 10 is a perspective view of certain parts of the mechanism showing the same in exploded relation with respect to each other.

The arrangement is such that there will result a maximum degree of efficient operation of the internal combustion engine with which my improved hydraulic lifting mechanism is associated. The objects and results herein above set forth may be accomplished by a mechanism constructed in accordance with the modified form shown in Figs. 9 and 10. Each cam 63', which is similar to the cams 52 engages the head 64 of a piston 65 arranged in the cylinder 39. This piston 65 has a reduced portion 66 which has slidable relation with respect to a plunger 67 arranged in an enlarged portion 68 of the cylinder 39. This reduced portion has ports 69 formed therein which are adapted to communicate with the intake port 70. This intake port 70 is partially closed by the plunger 67 when the plunger is in its lowermost position within the enlarged cylinder portion 68. The piston provides a ring 71 and formed in the plunger 67 is an under cut 72 into which the ring 71 is to move prior to the movement of the plunger 67. The plunger 67 is prevented from displacement from the reduced portion 66 of the piston 65 by a retaining ring 71'. The cylinder 39 terminates into an opening 72' normally closed by a cap 73 seated upon a sealing ring 74 and releasably secured in place by a removable split ring 75. This cap 73 is substantially dome-shaped in vertical cross section and has communicating therewith a conduit 24' similar to and for the purpose of the line 24 shown in Fig. 1. In this form of construction, as the piston moves outwardly in the cylinder the piston will close the port 70 prior to complete entrapment of the fluid in the conduit 24' to effect the initial opening movement of the valve head 13, the final movement of which is completed by movement of the plunger 67.

The results accomplished by this form of construction are substantially the same as that accomplished by the form shown in Figs. 1 to 8 inclusive.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A device of the class described comprising abutting plates providing therebetween a fluid reservoir and crank casing each of said plates providing one or more compression chambers, a piston mounted in each of said chambers and providing at opposite end portions enlarged heads, said piston having a longitudinal bore formed therein and lateral ports opening communication between the reservoir and said chamber, a compression sleeve slidably mounted on said piston between said heads and being of a length less than the distance between said heads whereby said piston may move a predetermined distance independently of movement of the sleeve by said piston, said sleeve being adapted to close said ports to close communication between said bore and said reservoir, a spring means in said chamber and engagng one of said heads to move said piston and sleeve in one direction, a hollow plug extending into said chamber and into which an adjacent end portion of said spring engages, and eccentric means arranged in said crank casing and engageable with the opposite head to move the piston and sleeve in an opposite direction.

EARL LOSSAU.

References Cited in the file of this patent

UNITED STATES PATENTS

| Number | Name | Date |
|---|---|---|
| 1,039,757 | Kitton | Oct. 1, 1912 |
| 1,062,580 | Bollee | May 27, 1913 |
| 1,692,845 | Kolb | Nov. 27, 1928 |
| 1,810,465 | Da Costa | June 16, 1931 |
| 2,389,374 | Levy | Nov. 20, 1945 |
| 2,392,543 | Mercier | Jan. 8, 1946 |